(12) United States Patent
Fujita et al.

(10) Patent No.: US 6,545,725 B1
(45) Date of Patent: Apr. 8, 2003

(54) APPARATUS FOR IDENTIFYING STANDARD AND NON-STANDARD VIDEO SIGNALS

(75) Inventors: Nobuko Fujita, Ibaraki (JP); Atsuhisa Kageyama, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/553,153

(22) Filed: Apr. 20, 2000

(30) Foreign Application Priority Data

Apr. 21, 1999 (JP) .......................................... 11-113837

(51) Int. Cl.[7] .............................. H04N 5/14; H04N 9/64
(52) U.S. Cl. ...................... 348/604; 348/449; 348/554; 348/558
(58) Field of Search ................................. 348/554, 553, 348/555, 558, 556, 441, 449, 604; 345/204, 242, 117; H04N 5/14, 3/27, 11/20, 7/01, 5/46, 9/64

(56) References Cited

U.S. PATENT DOCUMENTS

| | | | | |
|---|---|---|---|---|
| 4,860,090 A | * | 8/1989 | Murata et al. ............... | 348/604 |
| 5,532,749 A | * | 7/1996 | Hong ......................... | 348/449 |
| 5,943,101 A | * | 8/1999 | Hirtz et al. ................. | 348/604 |
| 6,329,981 B1 | * | 12/2001 | Lin et al. .................... | 348/441 |
| 6,366,327 B1 | * | 4/2002 | Renner et al. .............. | 348/558 |

* cited by examiner

Primary Examiner—John Miller
Assistant Examiner—Trang U. Tran
(74) Attorney, Agent, or Firm—Stevens, Davis, Miller & Mosher, LLP

(57) ABSTRACT

In order that such a signal as is conventionally determined to be a standard signal in the unit of one field and determined to be a non-standard signal in the unit of a plurality of fields can be determined to be a non-standard signal, the following are provided: a clock generating circuit for generating a clock of a frequency being a constant multiple of the color carrier frequency; a register for setting the clock count of one field section of a standard signal; a vertical counter for counting the number of clocks generated by the clock generating circuit, and being reset when the clock count reaches the value of the register; and a flip-flop receiving the counter output as the input and using an external vertical synchronizing signal as a load hold pulse. Consequently, the output of the flip-flop represents the inter-field shift of the clock count represented by the external vertical synchronizing signal from the standard signal which shift is accumulated over a plurality of fields, so that even such a signal as is conventionally determined to be a standard signal in the unit of one field and determined to be a non-standard signal in the unit of a plurality of fields can be determined to be a non-standard signal.

10 Claims, 7 Drawing Sheets

APPARATUS FOR IDENTIFYING STANDARD AND NON-STANDARD VIDEO SIGNALS

BACKGROUND OF THE INVENTION

1. Field of the Invention

The present invention relates to a standard and non-standard video signal identifying apparatus for determining whether a composite video signal input to a television receiver or the like is a standard signal or a non-standard signal.

The above-mentioned standard signal refers to a television signal in which the frequency of the color subcarrier signal is strictly managed so as to be exactly an integral multiple of the frequency of the vertical synchronizing signal like a broadcast wave (composite video signal) from a broadcasting station. The non-standard signal refers to a television signal in which the frequency of the color subcarrier signal is a non-integral multiple of the frequencies of the vertical synchronizing signal and the horizontal synchronizing signal like a playback video signal (composite video signal) output from a digital video tape recorder, a digital video camera, a digital still camera or other video apparatuses.

2. Description of the Prior Art

In television broadcast signals, the frequency of the color subcarrier signal is strictly managed so as to be exactly an integral multiple of the frequency of the vertical synchronizing signal. Therefore, television receivers are configured as described below in order to effectively use the relationship between the color subcarrier frequency and the vertical frequency and that the vertical synchronizing signal can be precisely played back even when the electric field is weak or when a disturbance occurs due to ghosts. That is, one burst signal is extracted from an input video signal, a clock of a frequency of $a \times f_{SC}$ (a is an integer not less than 1, and $f_{SC}$ is the color subcarrier frequency) is generated based on a color burst signal, and the clock is divided, thereby playing back the vertical synchronizing signal.

In the above-mentioned dividing operation, when a standard signal such as a broadcast wave is handled, vertical playback can be normally performed because standard signals satisfy.

$$V\text{count} = (a \times f_{SC}/f_H) \times (N/2).$$

Here, Vcount is the number of clocks of one field section, $f_H$ is the horizontal frequency, and N is the number of scanning lines of one frame.

However, when a non-standard signal like a signal obtained in special playback of a VTR (video tape recorder) is handled, the dividing operation cannot be normally performed because the following relationship holds for non-standard signals:

$$V\text{count} \neq (a \times f_{SC}/f_H) \times (N/2).$$

Therefore, in the case of a non-standard signal, vertical playback is performed by separating the vertical synchronizing signal from the video signal by a synchronizing separator circuit.

Moreover, in television receivers, a processing such as Y/C separation using a frame comb filter or inter-field interpolation is used to enhance the image quality. When the Y/C separation is used, in the case of standard signals in which the color subcarrier frequency is exactly an integral multiple of the vertical frequency, the luminance signal and the color signal can be precisely separated by the frame comb filter, so that the effect of enhancing the image quality is expected.

However, in the case of non-standard signals in which the color subcarrier frequency is a non-integral multiple of the vertical frequency, the luminance signal and the color signal cannot be separated precisely, so that the above-mentioned image quality enhancing processing rather degrades the image quality. Therefore, it is desirable that the image quality enhancing processing be performed only in the case of standard signals and be not performed in the case of non-standard signals.

In order that vertical synchronization playback is not performed by the synchronizing separator circuit or the image quality enhancing processing is not performed when the input video signal is a non-standard signal, it is necessary to detect that the video signal is a non-standard signal.

Now, the configuration and operation of a conventional apparatus for identifying standard and non-standard video signals will be described.

FIG. 7 is a block diagram showing a concrete example of the conventional standard and non-standard video signal identifying apparatus in the case of generation of the vertical synchronizing signal of an NTSC television receiver.

A reset circuit comprising an AND gate 401 outputs a reset signal when an external reset signal supplied from a microcomputer comes in or when an external vertical synchronizing signal separated by a synchronizing separator circuit (not shown) comes in. The reset signal is input to a reset terminal R of a vertical counter 402. Moreover, to the vertical counter 402, a clock of a frequency of $a \times f_{SC}$ generated by a clock generating circuit 403 is input to a clock terminal CLK. The clock generating circuit 403 generates the clock of a frequency of $a \times f_{SC}$ based on a color burst signal extracted from the video signal.

The vertical counter 402 counts the number of clocks of one field section after the reset signal is input. A load hold flip-flop 404, which receives the output of the vertical counter 402 as the input signal and uses the external vertical synchronizing signal as the load hold pulse, latches the value that the vertical counter 402 indicates when the external vertical synchronizing signal comes in, and outputs the latched value. That is, the output of the load hold flip-flop 404 represents the clock count of one field section defined by the external vertical synchronizing signal.

In a field clock count setting register 405, a value corresponding to the clock count of one field section of a standard signal is set. A subtracter 406 subtracts the value set in the field clock count setting register 405 from the output of the load hold flip-flop 404. The output value of the subtracter 406 corresponds to the shift of the clock count value of one field section defined by the external vertical synchronizing signal from the clock count value corresponding to the standard signal. Then, the output of the subtracter 406 is converted into an absolute value by an absolute value circuit 407 and the absolute value of the shift is output. In a threshold value setting register 408, a threshold value for identifying standard and non-standard signals is set. A comparator 409 compares the output of the absolute value circuit 407 with the threshold value set in the threshold value setting register 408. When the output of the absolute value circuit 407 is not more than the threshold value, the input video signal is determined to be a standard signal, and when the output exceeds the threshold value, the input video signal is determined to be a non-standard signal.

The basic idea of the above-described conventional apparatus for identifying standard and non-standard video signals is as follows: In the case of the NTSC system, the input video signal is determined to be a standard signal when the clock count Vcount of one field section satisfies the following relationship:

$$-M \leq \{Vcount - (a \times f_{SC}/f_H) \times (N/2)\} \leq M (M>0)$$

where M is the threshold value for identifying standard and non-standard signals. In other cases, the input video signal is determined to be a non-standard signal.

However, in the conventional apparatus for identifying standard and non-standard video signals, the identification of standard and non-standard signals is performed based on the clock count of only one field section. Therefore, a non-standard signal such as the output of a digital still camera in which the clock count is shifted by one clock (clock frequency $a \times f_{SC}$) in n field sections although the shift of the clock count of one field section is smaller than one clock and Vcount satisfies the above-mentioned relationship in the unit of one field is erroneously determined to be a standard signal.

For this reason, although the output of a digital still camera is a non-standard signal, a playback vertical synchronizing signal obtained by dividing the clock of a frequency of $a \times f_{SC}$ is used for playing back the image. Consequently, vertical synchronization is shifted every n fields because the output is actually a signal in which the clock count is shifted by one clock in n field sections as mentioned above.

SUMMARY OF THE INVENTION

Accordingly, an object of the present invention is to provide an apparatus for identifying standard and non-standard video signals with which even a non-standard signal having only a slight shift and being conventionally erroneously determined to be a standard signal in the unit of one field can be determined to be a non-standard signal.

An apparatus for identifying standard and non-standard video signals according to a first aspect of the invention comprises clock generating means, clock counting means, resetting means, count value holding means, first determining means, subtracting means, selecting means, and second determining means.

The clock generating means has the function of generating a clock of a frequency of $a \times f_{SC}$ (a is an integer not less than 1, and $f_{SC}$ is a color carrier frequency) based on a color burst signal extracted from a video signal.

The clock counting means whose maximum output value is a value corresponding to the number of clocks generated by the clock generating means in one field section of a standard signal has the function of counting the number of clocks generated by the clock generating means and repetitively changing an output value thereof from zero to the maximum output value.

The resetting means has the function of resetting a count value of the clock counting means to zero in response to input of an external reset signal and canceling the reset of the count value of the clock counting means in response to an external vertical synchronizing signal separated from the video signal and input after the input of the external reset signal.

The count value holding means has the function of holding the count value of the clock counting means in response to the input of the external vertical synchronizing signal.

The first determining means has the function of comparing an output value of the count value holding means with a first threshold value to thereby determine whether the output value of the count value holding means is zero or a value in the vicinity thereof, or the maximum output value of the clock counting means or a value in the vicinity thereof.

The subtracting means has the function of obtaining a difference between the output value of the count value holding means and the maximum output value of the clock counting means.

The selecting means has the function of, based on a result of the determination by the first determining means, selecting the output value of the count value holding means when the output value of the count value holding means is zero or a value in the vicinity thereof, and selecting the output value of the subtracting means when the output value of the count value holding means is the maximum output value of the clock counting means or a value in the vicinity thereof.

The second determining means has the function of determining that the video signal is a non-standard signal when an absolute value of an output value of the selecting means is higher than a second threshold value.

According to this configuration, in a system using a signal being a constant multiple a of the color carrier frequency $f_{SC}$ as the system clock, the clock count of the clock counting means returns to zero every time its output reaches the maximum output value, that is, every time the number of clocks is counted to the value corresponding to the clock count of one field section of the standard signal, and the clock counting means is not dependent on the incoming external vertical synchronizing signal. Consequently, the shift of the clock count of one field section is accumulated over a multiplicity of fields, so that even a signal in which the shift is not less than one clock in the unit of n fields although the shift is smaller than one clock and the relationship as the standard signal is satisfied in the unit of one field like the output of a digital still camera can be determined to be a non-standard signal.

In the above-described configuration, the clock counting means comprises, for example, a counter for counting the number of clocks generated by the clock generating means, a field clock count setting register for setting a value corresponding to the number of clocks output by the clock generating means in one field section of the standard signal, and a decode circuit for outputting a coincidence signal when a count value of the counter coincides with the set value of the field clock count setting register, and supplying the coincidence signal to a reset terminal of the counter.

By thus configuring the clock counting means, in a system using a signal being a constant multiple a of the color carrier frequency $f_{SC}$ as the system clock, only when the output of the vertical counter becomes the value corresponding to the clock count of the one field section of the standard signal which is the value set by the field clock count setting register, the vertical counter is reset so that its count value returns to zero, and is not dependent on the incoming external vertical synchronizing signal. Consequently, the shift of the clock count of one field section is accumulated over a multiplicity of fields, so that even a signal in which the shift is not less than one clock in the unit of n fields although the shift is smaller than one clock and the relationship as the standard signal is satisfied in the unit of one field like the output of a digital still camera can be determined to be a non-standard signal.

Moreover, in the above-described configuration, while it is desirable that the first threshold value be one-half the maximum output value of the clock counting means, the threshold value is not limited thereto. It may be any value that is higher than the maximum value of values in the vicinity of zero estimated to be the output value of the count value holding means and is lower than the minimum value of values in the vicinity of the maximum output value in the case of a non-standard signal.

The count value holding means comprises, for example, a load hold flip-flop receiving the external vertical synchronizing signal as a load hold input and receiving the clock generated by the clock generating circuit as a clock input. The resetting means comprises a set-reset flip-flop receiving the external reset signal as a set input, and receiving the external vertical synchronizing signal as a reset input.

An apparatus for identifying standard and non-standard video signals according to a second aspect of the invention comprises clock generating means, pulse thinning out means, clock counting means, count value holding means, n field clock count setting means, subtracting means, and determining means.

The clock generating means has the function of generating a clock of a frequency of $a \times f_{SC}$ (a is an integer not less than 1, and $f_{SC}$ is a color carrier frequency) based on a color burst signal extracted from a video signal.

The pulse thinning out means has the function of thinning out an external vertical synchronizing signal separated from the video signal, and outputting the thinned out signal once every n fields (n is a plural number).

The clock counting means has the function of counting the number of clocks generated by the clock generating means, and its count value is reset to 0 in response to an output pulse of the pulse thinning out means.

The count value holding means has the function of holding an output value of the clock counting means in response to the output pulse of the pulse thinning out means.

The n field clock count setting means has the function of setting a value corresponding to the number of clocks generated by the clock generating means in n field sections of a standard signal.

The subtracting means has the function of obtaining a difference between an output value of the count value holding means and the set value of the n field clock count setting means.

The determining means has the function of determining that the video signal is a non-standard signal when an absolute value of an output value of the subtracting means is higher than a predetermined threshold value.

According to this configuration, in a system using a signal being a constant multiple a of the color carrier frequency $f_{SC}$ as the system clock, the clock counting means counts the number of clocks of n field sections, the output value of the clock counting means produced immediately before the clock counting means is reset is held by the count value holding means, and the output value of the count value holding means is compared with the value corresponding to the clock count of n field sections of the standard signal set by the n field clock count setting means. Consequently, even a signal in which the shift is not less than one clock in the unit of n fields although the shift is smaller than one clock and the relationship as the standard signal is satisfied in the unit of one field can be determined to be a non-standard signal.

An apparatus for identifying standard and non-standard video signals according to a third aspect of the invention comprises clock generating means, burst extraction pulse generating means, burst extracting means, a band-pass filter, a latch pulse generating means, a holding means group, subtracting means, and determining means.

The clock generating means has the function of generating a clock of a frequency of $b \times f_H$ (b is a predetermined integer, and $f_H$ is a horizontal frequency) based on a horizontal synchronizing signal separated from a video signal. It is desirable that the integer b be not less than 500.

Now, why it is desirable that the integer b be not less than 500 will be explained. In television broadcasting, the horizontal frequency $f_H$ is 15.734264 kHz, and the burst frequency $f_{SC}$ is 3.579545 MHz. In the relationship between these two frequencies, the color burst signal is latched (data-held) at a predetermined timing, defined by a clock, within the period of the color burst portion represented by the burst extraction pulse. That is, one clock section of a sine wave of 3.579545 MHz is latched. Therefore, it is necessary that the frequency of the clock be not less than 3.579545 MHz. When b=500, $b \times f_H$=7.875 MHz, and the clock frequency is approximately twice the burst frequency. It is considered that the clock frequency is a value significant for comparing the held data after n fields.

The burst extraction pulse generating means has the function of generating a burst extraction pulse corresponding to a period of a color burst portion of the video signal once every field based on the external horizontal synchronizing signal and an external vertical synchronizing signal separated from the video signal, and the clock.

The burst extracting means has the function of extracting from the video signal a signal portion corresponding to an output period of the burst extraction pulse.

The band-pass filter whose center frequency is a burst frequency has the function of passing therethrough a burst frequency component of an output signal of the burst extracting means.

The latch pulse generating means has the function of generating, based on the burst extraction pulse and the clock, a latch pulse at a predetermined timing, defined by the clock, within the period of the color burst portion represented by the burst extraction pulse.

The holding means group comprises a number, (n+1), (n is a plural number) of holding means connected in series. The holding means hold an output of the band-pass filter in response to the latch pulse and transmit the output to succeeding holding means.

The subtracting means has the function of obtaining a difference between an output signal of the first holding means of the holding means group and an output signal of the (n+1) th holding means.

The determining means has the function of determining that the video signal is a non-standard signal when an absolute value of an output value of the subtracting means is higher than a predetermined threshold value.

According to this configuration, in a system using a signal being a constant multiple b of the horizontal frequency $f_H$ as the system clock, even a signal in which the shift is one clock in the unit of n fields although the relationship as the standard signal (Vcount≈b×N/2; N is the number of scanning lines of one frame, and N/2 is the number of scanning lines of one field) is satisfied in the unit of one field can be determined to be a non-standard signal.

That is, the level of the color burst signal at a timing, defined by the clock, within the period of the burst extraction pulse is detected in two fields being n fields away from each other, and the difference between the levels in the two fields is compared with the threshold value. Therefore, there is hardly any shift of the phase of the color burst signal between two consecutive fields, so that there is hardly any difference in the level of the color burst signal. Consequently, even in a case where a non-standard signal is erroneously determined to be a standard signal, since the phase shift of the color burst signal is accumulated and the difference in the level of the color burst signal is consequently accumulated, the signal can be determined to be a non-standard signal.

While the latch pulse generating means generates a latch pulse, for example, at the center of the period of the color burst portion represented by the burst extraction pulse, the latch pulse may be generated at any timing other than the center that is defined by the clock of a frequency being a constant multiple b of the horizontal frequency $f_H$. The holding means comprises a load hold flip-flop receiving the latch pulse as a load hold input and receiving the clock as a clock input.

DESCRIPTION OF THE PREFERRED EMBODIMENTS

Hereinafter, embodiments of the present invention of a standard and non-standard video signal identifying apparatus for determining whether a video signal is a standard signal or a non-standard signal will be described with reference to the drawings.

First Embodiment

Figure 1:
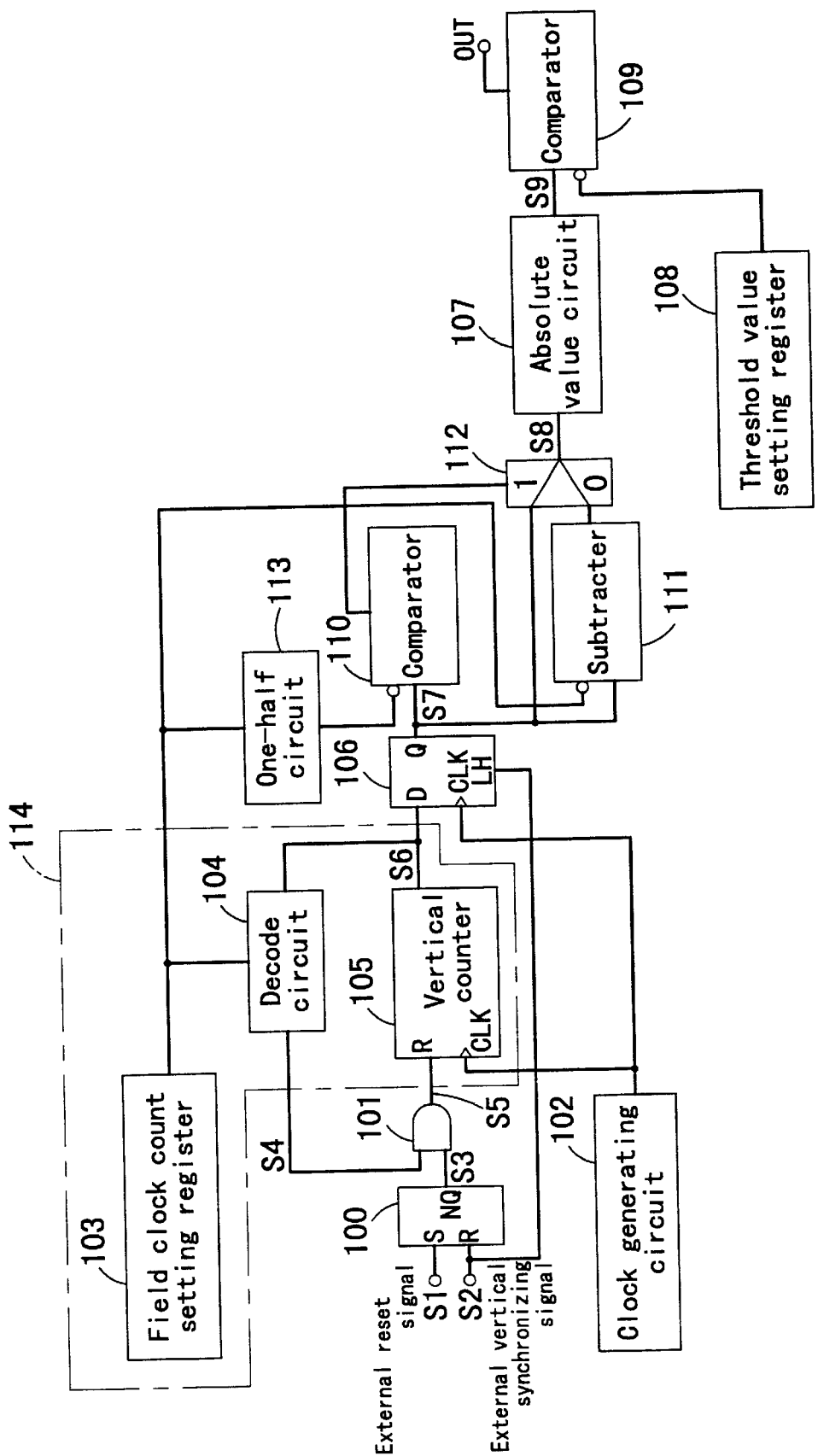
FIG. 1 is a block diagram of a standard and non-standard video signal identifying apparatus according to a first embodiment of the present invention.

FIG. 1 is a block diagram of a standard and non-standard video signal identifying apparatus according to a first embodiment of the present invention. In FIG. 1, a set-reset latch 100 comprises a set-reset flip-flop using an external reset signal S1 as the set signal and using an external vertical synchronizing signal S2 as the reset signal. While the set-reset latch 100 as resetting means has a Q output and an NQ output (the inversion of Q), in this embodiment, the NQ output is used and the Q output is not used. The external reset signal Si is supplied from a microcomputer (not shown). The external vertical synchronizing signal S2 is the output of a synchronizing separator circuit (not shown) receiving a video signal as the input.

A two-input AND gate 101 receives an NQ output signal S3 of the set-reset latch 100 as one input signal. A clock generating circuit 102 as clock generating means generates a clock of a frequency of $a \times f_{SC}$ which is a constant multiple a (a is an integer not less than 1) of a color carrier frequency $f_{SC}$, based on a color burst signal extracted from a video signal.

A field clock count setting register 103 sets a value corresponding to the clock count $(a \times f_{SC}/f_H) \times (N/2)$ ($f_H$ is the horizontal synchronizing frequency, and N is the number of scanning lines of one frame) of one field section of a standard signal. A decode circuit 104 decodes the value set by the field clock count setting register 103. The output S4 of the decode circuit 104 is input to the two-input AND gate 101 as the other input signal.

A vertical counter 105 receives the output S5 of the AND gate 101 as the reset input, and counts the number of clocks of the frequency of $a \times f_{SC}$ generated by the clock generating circuit 102. The output S6 of the vertical counter 105 is input to the decode circuit 104 to be decoded. Specifically, when the output S6 of the vertical counter 105 coincides with the value set by the field clock count setting register 103, a coincidence signal is generated by the decode circuit 104.

The vertical counter 105, the field clock count setting register 103 and the decode circuit 104 constitute a clock counting circuit 114. The clock counting circuit 114 serves as clock counting means.

The load hold flip-flop 106 as count value holding means receives the output S6 of the vertical counter 105 as the input signal, receives the clock of a frequency of $a \times f_{SC}$ generated by the clock generating circuit 102 as the clock input, and uses the external vertical synchronizing signal S2 as the load hold pulse. A one-half circuit 113 receives the value set by the field clock count setting register 103 as the input, and outputs a value one-half the received value. A comparator 110 as first determining means compares the output S7 of the load hold flip-flop 106 and the value one-half the value set by the field clock count setting register 103 (=the output value of the one-half circuit 113).

A subtracter 111 as subtracting means subtracts the value set by the field clock count setting register 103 from the output S7 of the load hold flip-flop 106. A selector 112 as selecting means selects the output of the subtracter 111 or the output of the load hold flip-flop 106 in accordance with the result of the comparison by the comparator 110, and outputs the selected one. An absolute value circuit 107 receives the output S8 of the selector 112 as the input, and outputs the absolute value of the input value. A threshold value setting register 108 sets a threshold value for identifying standard and non-standard signals. A comparator 109 as second determining means compares the output S9 of the absolute value circuit 107 with the threshold value set by the threshold value setting register 108.

Figure 2:
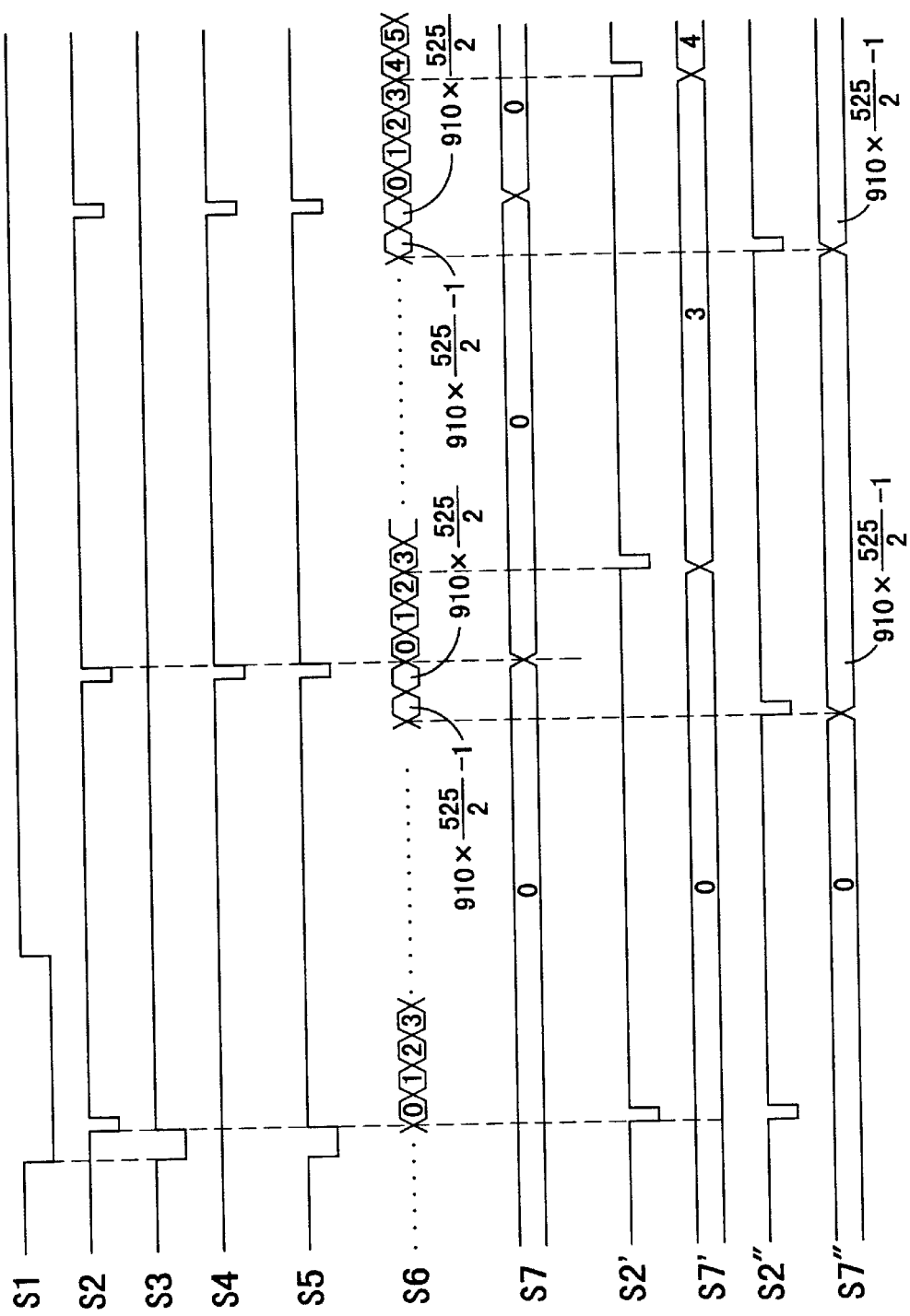
FIG. 2 is a timing chart showing the signal levels of components of the standard and non-standard video signal identifying apparatus according to the first embodiment of the present invention.

The operation of the standard and non-standard video signal identifying apparatus configured as described above will be described with reference to FIG. 2. FIG. 2 is a timing chart showing the signal levels of the components of FIG. 1. Reference designations are given in correspondence with those of FIG. 1. Reference designation Si represents the external reset signal. Reference designation S2 represents the external vertical synchronizing signal synchronizing-separated from the video signal. Reference designation S3 represents the NQ output signal of the set-reset latch 100. Reference designation S4 represents the output signal of the decode circuit 104. Reference designation S5 represents a counter reset signal output from the two-input AND gate 101 and input to the vertical counter 105. Reference designation S6 represents the output of the vertical counter 105 and shows a condition where the number of clocks of one field section is counted. Reference designation S7 represents the output of the load hold flip-flop 106 and shows the output of the vertical counter 105 produced when the external vertical synchronizing signal S2 comes in.

The external reset signal S1 is high under normal state and is low when a reset request is provided. The external reset signal S1 is input to the set-reset latch 100 as the set signal. As the external vertical synchronizing signal S2, a negative pulse comes once every field section. The external vertical synchronizing signal S2 is input to the set-reset latch 100 as the reset signal. Therefore, the NQ output signal S3 of the set-reset latch 100 is set to be low when the external reset signal S1 is input (low-level input), and is reset to be high when the external vertical synchronizing signal S2 comes in. That is, the NQ output signal S3 is output as a low-level signal during the period from the provision of the reset request by the external reset signal S1 to the first incoming of the external vertical synchronizing signal S2.

The NQ output signal S3 is input to the two-input AND gate 101. When the NQ output signal S3 is low, the output signal S5 of the two-input AND gate 101 is also low. The output signal S5 is input to the vertical counter 105 as the counter reset signal. Therefore, the vertical counter 105 is reset by the NQ output signal S3 becoming low, and the reset state is canceled by the NQ output signal S3 recovering to high. Moreover, the vertical counter 105 is temporarily reset in response to the low-level coincidence signal from the decode circuit 104.

Assuming now that the clock generating circuit 102 generates the clock of $a \times f_{SC}$ ($\approx$14.32 MHz; here, a=4, and $f_{SC}$ 3.58 MHz), in the case of the NTSC standard signal, the horizontal synchronizing frequency $f_H$ is 15734.264 Hz, the number of scanning lines of one frame N is 525, the clock count of one horizontal section is 910 clocks, and the clock count of one field section is 910×525/2 clocks.

Therefore, the output S6 of the vertical counter 105 becomes 0 at the instant when a reset request is provided by the counter reset signal S5, and thereafter, the vertical counter 105 counts up to the vicinity of 910×525/2 which is the clock count of one field section.

In the field clock count setting register 103, a value corresponding to the clock count (910×525/2) of one field section of the standard signal is set. The output signal S4 of the decode circuit 104 becomes low when the output S6 of the vertical counter 105 becomes the set value (910×525/2). The output signal S4 of the decode circuit 104 is input to the two-input AND gate 101, so that the output S5 of the two-input AND gate 101 becomes low. Consequently, the vertical counter 105 is reset again. That is, by counting the number of clocks, the vertical counter 105 repetitively changes the output value thereof from 0 to 910×525/2 which is the clock count of one field section of the standard signal like 0, 1, 2, 3, . . . , 910×525/2−1, 910×525/2, 0, 1, 2, . . . , 910×525/2, 0, 1, 2, . . . every time the clock comes in. That is, the vertical counter 105 can be considered as a scale-of-910×525/2 counter.

The load hold flip-flop 106 receives the output S6 of the vertical counter 105 as the input and uses the external vertical synchronizing signal S2 as the load hold pulse. Therefore, it latches the output S6 of the vertical counter 105 when the external vertical synchronizing signal S2 comes in. Therefore, the output S7 of the load hold flip-flop 106 represents the shift between the vertical synchronizing signal in the standard signal, and the external vertical synchronizing signal S2.

For example, when the clock count of one field section represented by the incoming external vertical synchronizing signal S2 is always the same as the clock count (910×525/2) of one field section of the standard signal, the load hold flip-flop 106 continues outputting 0 as the output S7.

Next, a case where the external vertical synchronizing signal S2 is as shown by reference designation S2' of FIG. 2, that is, a case where the clock count of one field section is higher than that of the standard signal will be described. When the clock count of one field section represented by the external vertical synchronizing signal S2' is higher than that of the standard signal by one clock, the load hold flip-flop 106 outputs 1 as the output S7' and when the c lock count is higher by two clocks, the load hold flip-flop 106 outputs 2 as the output S7'.

For example, even in a case where the shift of the clock count of one field section represented by the external vertical synchronizing signal from that of the standard signal is smaller than one clock and is larger by not less than one clock in the unit of n fields, the vertical counter 105 is reset only when the output S6 thereof becomes 910×525/2 which is the value set by the field clock count setting register 103, and the counter reset S5 is not dependent on the incoming external vertical synchronizing signal. Consequently, the shift of the clock count of one field section is accumulated over a multiplicity of fields. Therefore, even in the case of such a signal, after the counter reset S5 is supplied, although the output S7 of the first field is 0, 1 is output when n fields have passed, and 2 is output when 2×n fields have passed.

Likewise, a case where the external vertical synchronizing signal S2 is as shown by the signal S2" of FIG. 2, that is, a case where the clock count of one field section is lower than that of the standard signal will be described. When the clock count of one field represented by the external vertical synchronizing signal S2" is lower than that of the standard signal by one clock, the load hold flip-flop 106 outputs 910×525/2−1 as the output S7", and when the clock count is lower by two clocks, the load hold flip-flop 106 outputs 910×525/2−2 as the output S7". Even when the shift of the clock count of one field section represented by the external vertical synchronizing signal from that of the standard signal is smaller than one clock and is smaller by not less than one clock in the unit of n fields, the reset S5 of the vertical counter 105 is not dependent on the incoming external vertical synchronizing signal. Consequently, the shift of the clock count of one field section is accumulated over a multiplicity of fields. After the counter reset S5 is supplied, although the output S7 of the first field is 0, 910×525/2−1 is output when n fields have passed, and when 2×n fields have passed, 910×525/2−2 is output.

The comparator 110 compares the output S7 of the load hold flip-flop 106 and the value one-half the clock count value of one field section of the standard signal set by the field clock count setting register 103 (=the output value of the one-half circuit 113). When the output S7 of the load hold flip-flop 106 is larger, a low-level signal is output as the control signal of the selector 112, and when the output S7 is smaller, a high-level signal is output as the control signal. When the output S7 of the load hold flip-flop 106 is 0, since the output S7 is smaller than the value set by the field clock count setting register 103, the comparator 110 outputs a high-level signal, and the selector 112 selects the output S7 of the load hold flip-flop 106.

The subtracter 111 subtracts the clock count (910×525/2) of one field section of the standard signal set by the field clock count setting register 103 from the output S7 of the load hold flip-flop 106. When the clock count of one field section represented by the external vertical synchronizing system S2 is lower than that of the standard signal, the value of the shift is calculated by the subtracter 111. That is, when the clock count of one field section represented by the external vertical synchronizing signal S2 is lower than that of the standard signal by one clock, since the output S7 of the load hold flip-flop 106 is 910×525/2−1, the output of the subtracter 111 is (910×525/2−1)−(910×525/2)=−1, and −1 is output.

The selector 112 selects the output of the subtracter 111 when the control signal is low, and selects the output S7 of the load hold flip-flop 106 when the control signal is high. That is, the output S8 of the selector 112 expresses the shift of the external vertical synchronizing signal S2 from the standard signal with a positive or negative value. When the external vertical synchronizing signal S2 is larger than the standard signal by one clock, 1 is output, and when the signal S2 is smaller by one clock, −1 is output. The positive or negative value representing the shift is converted into an absolute value by the absolute value circuit 107, and is input to the comparator 109. The comparator 109 compares the absolute value of the shift obtained by the absolute value circuit 107 with the threshold value set by the threshold value setting register 108. The output of the comparator 109 is the result of the standard and non-standard signal identification. When the absolute value of the shift is not more than the threshold value, the output OUT of the comparator 109 becomes, for example, low and the video signal is determined to be a standard signal. When the absolute value is higher than the threshold value, the output OUT of the comparator 109 becomes, for example, high and the video signal is determined to be a non-standard signal. The threshold value is set at a given value such as 1 or 2 in the threshold value setting register 108 by input means such as a microcomputer or a switch.

As described above, according to this embodiment, in a system using a signal being a constant multiple a of the color carrier frequency $f_{SC}$ as the system clock, only when the output S6 of the vertical counter 105 becomes the clock count of the one field section of the standard signal which is the value set by the field clock count setting register 103, the vertical counter 105 is reset so that its count value returns to 0, and is not dependent on the incoming external vertical synchronizing signal S2. Therefore, the shift of the clock count of one field section is accumulated over a multiplicity of fields. Consequently, even a signal in which the shift is not less than one clock in the unit of n fields although the relationship as the standard signal is satisfied in the unit of one field like the output of a digital still camera can be determined to be a non-standard signal.

Second Embodiment

Figure 3:
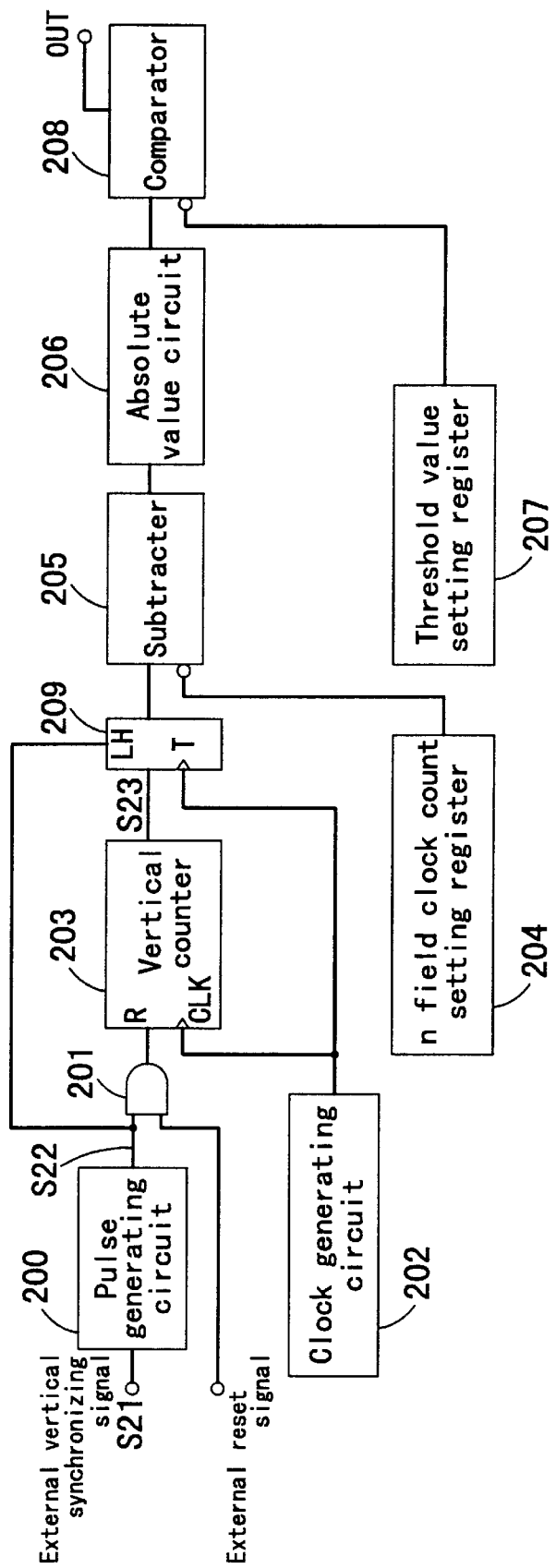
FIG. 3 is a block diagram of a standard and non-standard video signal identifying apparatus according to a second embodiment of the present invention.

FIG. 3 is a block diagram of a standard and non-standard video signal identifying apparatus according to a second embodiment of the present invention. In FIG. 3, a pulse generating circuit 200 as pulse thinning out means receives an external vertical synchronizing signal S21 as the input, thins out the external vertical synchronizing signal S21, and outputs the thinned out signal once every n fields (n is a plural number). A two-output AND gate 201 receives the output S22 of the pulse generating circuit 200 and an external reset signal as the inputs. The external reset signal is supplied from a microcomputer (not shown), and the external vertical synchronizing signal S21 is the output of a synchronizing separator circuit (not shown) receiving a video signal as the input. As n, for example, 8 or 16 is considered.

A clock generating circuit 202 as clock generating means generates a clock of a frequency of a×$f_{SC}$ (a is an integer not less than 1) which is a constant multiple a of the color carrier frequency $f_{SC}$, based on a color burst signal extracted from the video signal. A vertical counter 203 as clock counting means receives the output of the two-input AND gate 201 as the reset input, and receives the clock of a frequency of a×$f_{SC}$ generated by the clock generating circuit 202 as the clock input.

An n field clock count setting register 204 as n field clock count setting means sets the clock count of n field sections (a×$f_{SC}/f_H$)×(N/2)×n ($f_H$ is the horizontal synchronizing frequency, and N is the number of scanning lines of one frame). A load hold flip-flop 209 as count value holding means holds the output S23 of the vertical counter 203 with the output of the pulse generating circuit 200 as the load hold pulse. A subtracter 205 as subtracting means subtracts the value set by the n field clock count setting register 204 from the output of the load hold flip-flop 209. An absolute value circuit 206 obtains the absolute value of the output of the subtracter 205. A threshold value setting register 207 sets a threshold value for identifying standard and non-standard signals. A comparator 208 as determining means compares the output of the absolute value circuit 206 with the threshold value set by the threshold value setting register 207.

Figure 4:
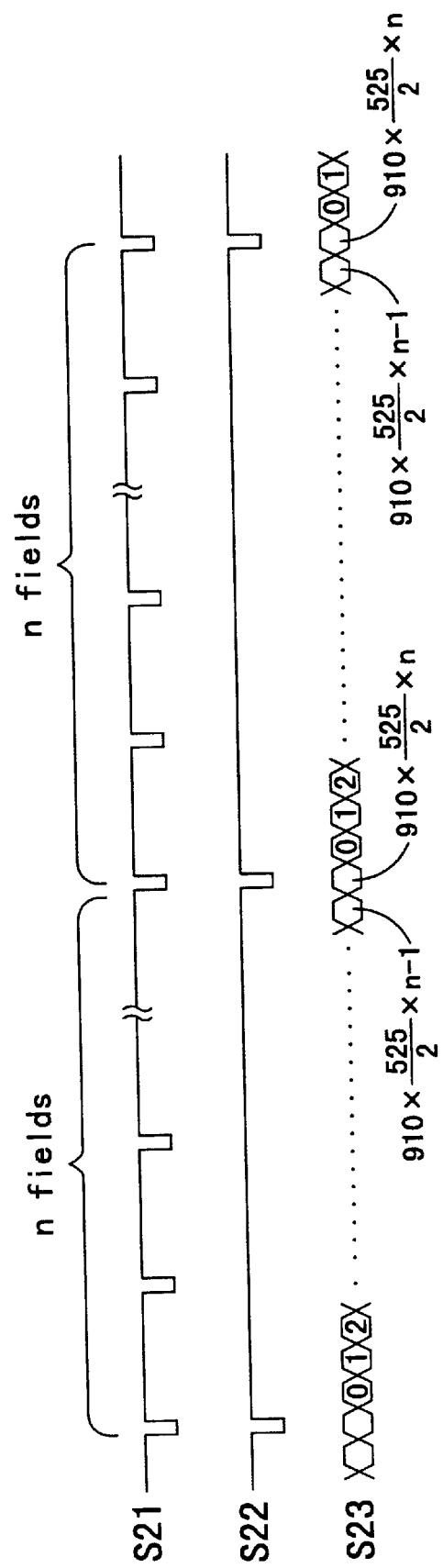
FIG. 4 is a timing chart showing the signal levels of components of the standard and non-standard video signal identifying apparatus according to the second embodiment of the present invention.

The operation of the standard and non-standard video signal identifying apparatus configured as described above will be described with reference to FIG. 4. FIG. 4 is a timing chart showing the signal levels of the components of FIG. 3. In FIG. 4, reference designation S21 represents the external vertical synchronizing signal. Reference designation S22 represents the output of the pulse generating circuit 200 outputting the external vertical synchronizing signal once every n fields. Reference numeral S23 represents the output of the vertical counter 203 and shows that the number of clocks of n field sections is counted.

The external vertical synchronizing signal S21 comes in as a negative pulse once every field, and is input to the pulse generating circuit 200. The pulse generating circuit 200 thins out the external vertical synchronizing signal S21 input once every field, and outputs the thinned out signal once every n fields. The external reset signal is high under normal state and is low when a reset request is provided. The output S22 of the pulse generating circuit 200 and the external reset signal are input to the two-input AND gate 201, and a counter reset signal is output from the two-input AND gate 201. The counter reset signal is a negative signal. The counter reset signal is output as a low-level signal when a reset request is provided by the external reset signal, and is output as a low-level signal once every n fields in response to the output S22 of the pulse generating circuit 200.

The vertical counter 203 receives the clock of a frequency of a×$f_{SC}$ generated by the clock generating circuit 202 as the clock input, and receives the output of the two-input AND gate 201 as the counter reset signal. Therefore, when there is no reset request by the external reset signal, the vertical counter 203 is reset once every n fields, and counts the number of clocks of n field sections.

Assuming now that the clock generating circuit 202 generates the clock of a×$f_{SC}$ (=14.32 MHz; here, a=4, and $f_{SC}$=3.58 MHz), in the case of the NTSC standard signal, the clock count of n field sections is 910×525/2×n clocks.

Therefore, the output S23 of the vertical counter 203 becomes 0 at the instant when a reset request is provided by the counter reset signal, and the vertical counter 203 counts up to the vicinity of 910×525/2×n which is the clock count of n fields. Then, by the output pulse of the pulse generating circuit 200, the output S23 of the vertical counter 203 produced immediately before the counter 203 is reset is latched by the load hold flip-flop 209.

In the n field clock count setting register 204, a value corresponding to the clock count (910×525/2×n) of n field sections of the standard signal is set. The subtracter 205 subtracts the value set in the n field clock count setting register 204 from the output of the load hold flip-flop 209. That is, the output of the subtracter 205 expresses the shift of the clock count of n field sections represented by the external vertical synchronizing signal S21 from the standard signal.

For example, when the clock count of n field sections represented by the incoming external vertical synchronizing signal is always the same as the clock count (910×525/2×n) of n field sections of the standard signal, the output of the subtracter 205 always represents 0. When the clock count of n field sections represented by the incoming external vertical synchronizing signal is higher by one clock than the clock count (910×525/2×n) of n field sections of the standard signal, the output of the subtracter 205 represents 1. When the clock count of n field sections represented by the incoming external vertical synchronizing signal is lower by one clock than the clock count (910×525/2×n) of n field sections of the standard signal, the output of the subtracter 205 represents −1.

The output of the subtracter 205 representing the shift is converted into an absolute value by the absolute value circuit 206, and is input to the comparator 208. The comparator 208 compares the absolute value of the shift obtained by the absolute value circuit 206 with the threshold value set by the threshold value setting register 207. The output of the comparator 208 is the result of the standard and non-standard signal identification. When the absolute value of the shift is not more than the threshold value, the output OUT of the comparator 208 becomes, for example, low and the video signal is determined to be a standard signal. When the absolute value is higher than the threshold value, the output OUT of the comparator 208 becomes, for example, high and the video signal is determined to be a non-standard signal. The threshold value is set at a given value such as 1 or 2 in the threshold value setting register 207 by input means such as a microcomputer or a switch.

As described above, according to this embodiment, in a system using a signal being a constant multiple a of the color carrier frequency $f_{SC}$ as the system clock, the vertical counter 203 counts the number of clocks of n field sections, and the clock count is compared with the clock count of n field sections of the standard signal set by the n field clock count setting register 204. Consequently, even a signal in which the shift is one clock in the unit of n fields although the relationship as the standard signal is satisfied in the unit of one field can be determined to be a non-standard signal.

Third Embodiment

Figure 5:
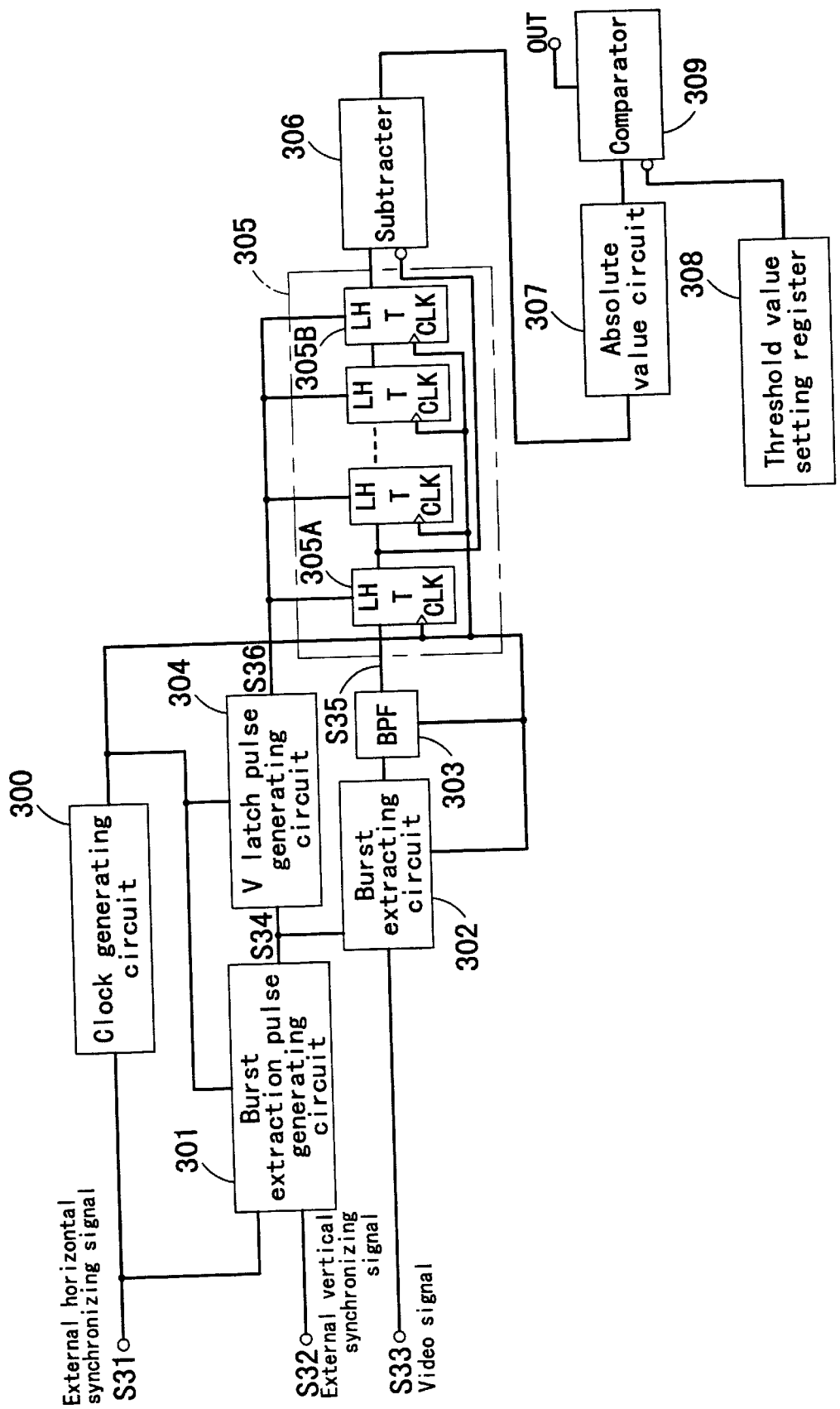
FIG. 5 is a block diagram of a standard and non-standard video signal identifying apparatus according to a third embodiment of the present invention.

FIG. 5 is a block diagram of a standard and non-standard video signal identifying apparatus according to a third embodiment of the present invention. In FIG. 5, a clock generating circuit 300 as clock generating means receives as the input an external horizontal synchronizing signal S31 separated from a video signal, and generates a clock of a frequency of $b \times f_H$ (b is, for example, an integer not less than 500) being a constant multiple b of the horizontal frequency $f_H$. A burst extraction pulse generating circuit 301 as burst extraction pulse generating means receives the external horizontal synchronizing signal S31, an external vertical synchronizing signal S32 and the clock of a frequency of $b \times f_H$ as the inputs, and outputs only a color burst portion of the video signal as a high-level signal once every field. A burst extracting circuit 302 as burst extracting means receives the output S34 of the burst extraction pulse generating circuit 301, the video signal S33 and the clock of a frequency of $b \times f_H$ as the inputs.

Now, why it is desirable that the integer b be not less than 500 will be explained. In television broadcasting, the horizontal frequency $f_H$ is 15.734264 kHz, and the burst frequency $f_{SC}$ is 3.579545 MHz. In the relationship between these two frequencies, the color burst signal is latched (data-held) at a predetermined timing, defined by a clock, within the period of the color burst portion represented by the burst extraction pulse. That is, one clock section of a sine wave of 3.579545 MHz is latched. Therefore, it is necessary that the frequency of the clock be not less than 3.579545 MHz. When b=500, $b \times f_H$=7.875 MHz, and the clock frequency is approximately twice the burst frequency. It is considered that the clock frequency is a value significant for comparing the held data after n fields. In the actual system, b=910, and the clock frequency is approximately 14.3 MHz.

The video signal S33 is a digital signal supplied from an input source such as a digital still camera, a VTR, a DVD or a tuner. The external horizontal synchronizing signal S31 and the external vertical synchronizing signal S32 are outputs of a synchronizing separator circuit (not shown) receiving the video signal 33 as the input.

A band-pass filter 303 is a digital filter receiving the output of the burst extracting circuit 302 as the input and using the burst frequency as the center frequency. A V (vertical) latch pulse generating circuit 304 as latch pulse generating means receives the output S34 of the burst extraction pulse generating circuit 301 and the clock of a frequency of $b \times f_H$ as the inputs, and generates a pulse of a width of one clock at the center of the color burst portion represented by the output S34 of the burst extraction pulse generating circuit 301. The V latch pulse generating circuit 304 generates a pulse at the center of the color burst portion once every field (one vertical period). The pulse generated position is not limited to the center of the color burst portion, but the pulse may be generated at any position of the color burst portion that is defined by the clock of a frequency of $b \times f_H$.

A load hold flip-flop group 305 as holding means comprises a number, (n+1), (n is a plural number) of load hold flip-flops connected in series. Each load hold flip-flop uses the output S36 of the V latch pulse generating circuit 304 as the load hold pulse, and receives the clock generated by the clock generating circuit 300 as the clock input. To the input of the first load hold flip-flop 305A of a number, n, of flip-flops connected in series, the output S35 of the band-pass filter 303 is supplied.

A subtracter 306 as subtracting means receives as the inputs the output of the first load hold flip-flop 305A of the number, n, of flip-flops of the load hold flip-flop group 305 connected in series, and the output of the (n+1)th load hold flip-flop 305B, and obtains the difference between the two input signals. An absolute value circuit 307 receives the output of the subtracter 306 as the input. A threshold value setting register 308 sets a threshold value for identifying standard and non-standard signals. A comparator 309 as determining means compares the output of the absolute value circuit 307 with the threshold value set by the threshold value setting register 308.

Figure 6:
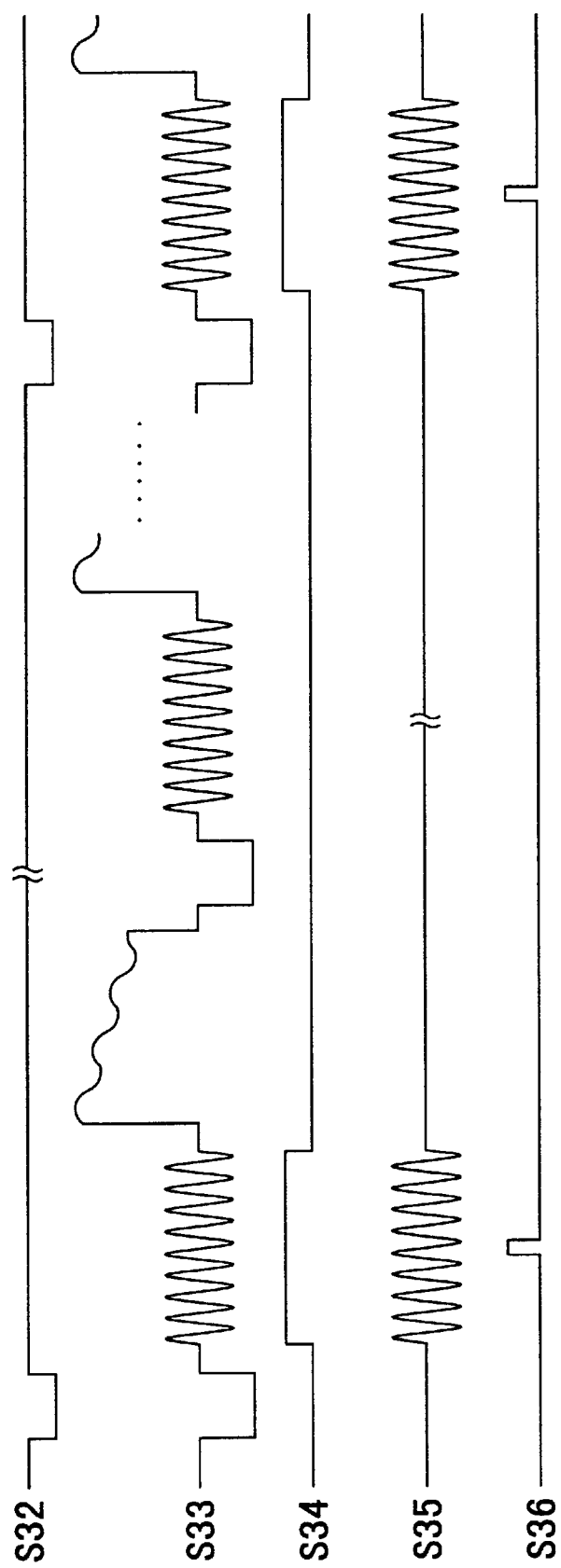
FIG. 6 is a timing chart showing the signal levels of components of the standard and non-standard video signal identifying apparatus according to the third embodiment of the present invention.
Figure 7:
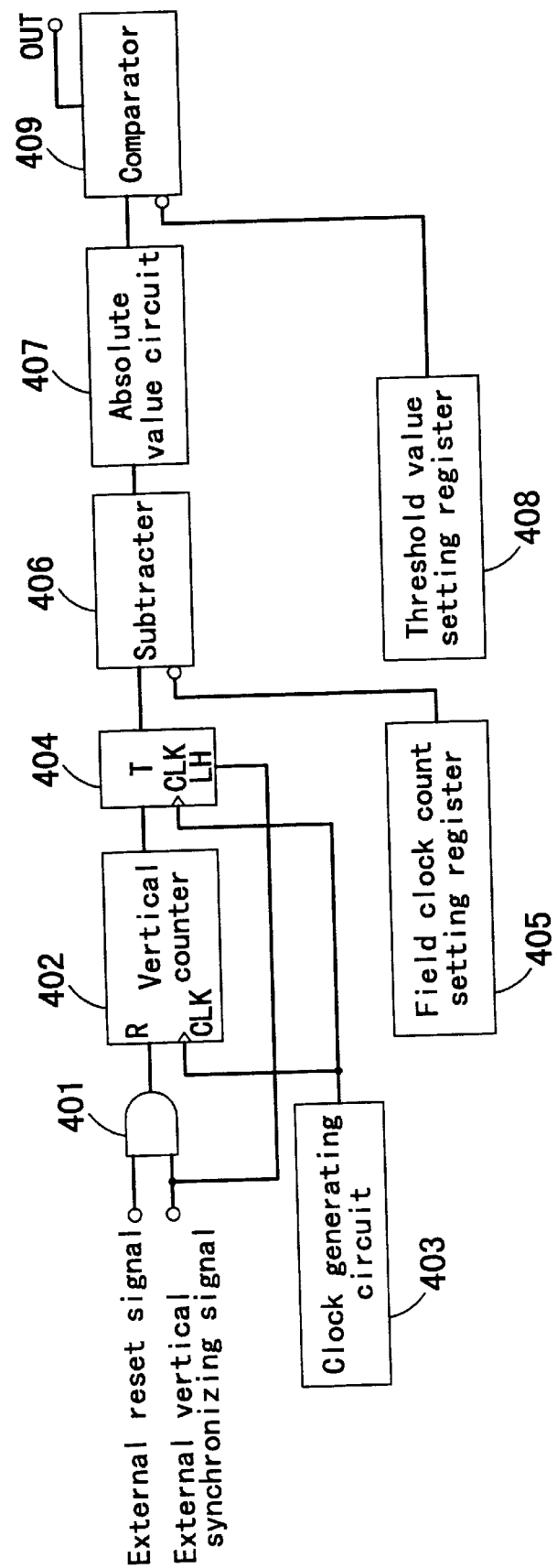
FIG. 7 is a block diagram of the conventional standard and non-standard video signal identifying apparatus.

The operation of the standard and non-standard video signal identifying apparatus configured as described above will be described with reference to FIG. 6. FIG. 6 is a timing chart showing principal signal levels of components of FIG. 5. Reference designation S32 represents the external vertical synchronizing signal. Reference numeral S33 represents the video signal. Reference numeral S34 represents the output of the burst extraction pulse generating circuit 301, that is, the burst extraction pulse only the color burst portion of which becomes high once every field. Reference numeral S35 represents a burst signal extracted from the video signal S33 once every field. Reference numeral S36 represents the pulse of a width of one clock at a frequency of $b \times f_H$ at the center of the burst extraction pulse S34.

The external horizontal synchronizing signal S31 is input to the clock generating circuit 300, and is multiplied into a frequency of $b \times f_H$ being a constant multiple b of the horizontal frequency $f_H$. To the burst extraction pulse generating circuit 301, the external horizontal synchronizing signal S31, the external vertical synchronizing signal S32 and the clock of a frequency of $b \times f_H$ are input. The burst extraction pulse generating circuit 301 outputs once every field the burst extraction pulse S34 only the color burst portion of the video signal of which is high.

The burst extraction pulse generating circuit 301 comprises, for example, a vertical counter using the external vertical synchronizing signal S32 as the reset pulse and using the external horizontal synchronizing signal S31 as the count up pulse, and a horizontal counter using the external horizontal synchronizing signal S31 as the reset pulse and using the clock of a frequency of $b \times f_H$ as the count up pulse. The burst extraction pulse generating circuit 301 outputs a pulse when to which line of one field the burst extraction pulse S34 is output is set by the microcomputer and the vertical counter reaches the set number of lines, and when the position in one line where the burst signal is multiplexed is set by the microcomputer and the horizontal counter reaches the set position.

To the burst extracting circuit 302, the video signal S33, the burst extraction pulse S34 and the clock of a frequency of $b \times f_H$ are input, and the color burst portion of the burst extraction pulse S34 shown by the high-level section is extracted from the digital video signal S33. Then, only the burst signal S35 is extracted at the band-pass filter 303 whose center frequency is the burst frequency.

To the V latch pulse generating circuit 304, the burst extraction pulse S34 and the clock of a frequency of $b \times f_H$ are input, and the V latch pulse generating circuit 304 generates the V latch pulse S36 with a width of one clock (frequency $b \times f_H$), for example, at the center of the burst extraction pulse S34.

Each of the load hold flip-flops of the load hold flip-flop group 305 uses the output S36 of the V latch pulse generating circuit 304 as the load hold pulse, and receives as the clock input the clock of a frequency of $b \times f_H$ multiplied by the clock generating circuit 300. To the first load hold flip-flop 305A, the burst signal S35 from the band-pass filter 303 is supplied as the input signal.

The output of each load hold flip-flop represents the value of the burst signal at the center of the burst portion represented by the output S36 of the V latch pulse generating circuit, and is output once every field. The output of the first load hold flip-flop 305A represents the value at the center of the burst portion in the newest field. The output of the (n+1) th load hold flip-flop 305B represents the value at the center of the burst portion in the field preceding the newest field by n fields.

The subtracter 306 receives as the inputs the output of the first load hold flip-flop 305A of the load hold flip-flop group 305 and the output of the (n+1) th load hold flip-flop 305B, and obtains the difference therebetween, thereby outputting the shift of the burst signal in n fields. The positive or negative value representing the shift is converted into an absolute value by the absolute value circuit 307, and is input to the comparator 309.

The comparator 309 compares the absolute value of the shift obtained by the absolute value circuit 307 with the threshold value set by the threshold value setting register 308. The output of the comparator 309 is the result of the standard and non-standard signal identification. When the absolute value of the shift is not more than the threshold value, the output OUT of the comparator 309 becomes, for example, low and the video signal is determined to be a standard signal. When the absolute value is higher than the threshold value, the output OUT of the comparator 309 becomes, for example, high and the video signal is determined to be a non-standard signal. The threshold value is set at a given value in the threshold value setting register 308 by input means such as a microcomputer or a switch.

As described above, according to this embodiment, in a system using a signal being a constant multiple b of the horizontal frequency $f_H$ as the system clock, the value at the center of the color burst is compared in two fields being n fields away from each other. Therefore, even in a case where a non-standard signal is erroneously determined to be a standard signal because the difference in the value at the center of the color burst is small when the comparison is made between two consecutive fields, the signal can be determined to be a non-standard signal because the shift of the value at the center of the color burst is accumulated in the unit of n fields.

What is claimed is:

1. An apparatus for identifying standard and non-standard video signals, comprising:

clock generating means for generating a clock of a frequency of $a \times f_{SC}$ (a is an integer not less than 1, and $f_{SC}$ is a color carrier frequency) based on a color burst signal extracted from a video signal;

clock counting means whose maximum output value is a value corresponding to the number of clocks generated by said clock generating means in one field section of a standard signal, said clock counting means counting the number of clocks generated by said clock generating means, and repetitively changing an output value thereof from zero to the maximum output value;

resetting means for resetting a count value of said clock counting means to zero in response to input of an external reset signal, and canceling the reset of the count value of said clock counting means in response to an external vertical synchronizing signal separated from the video signal and input after the input of the external reset signal;

count value holding means for holding the count value of said clock counting means in response to the input of the external vertical synchronizing signal;

first determining means for comparing an output value of said count value holding means with a first threshold value to thereby determine whether the output value of said count value holding means is zero or a value in the vicinity thereof, or the maximum output value of said clock counting means or a value in the vicinity thereof;

subtracting means for obtaining a difference between the output value of said count value holding means and the maximum output value of said clock counting means;

selecting means for, based on a result of the determination by said first determining means, selecting the output value of said count value holding means when the output value of said count value holding means is zero or a value in the vicinity thereof, and selecting the output value of said subtracting means when the output value of said count value holding means is the maximum output value of the clock counting means or a value in the vicinity thereof; and second determining means for determining that the video signal is a non-standard signal when an absolute value of an output value of said selecting means is higher than a second threshold value.

2. An apparatus for identifying standard and non-standard video signals according to claim 1, wherein said clock counting means comprises:

a counter for counting the number of clocks generated by said clock generating means;

a field clock count setting register for setting a value corresponding to the number of clocks output by said clock generating means in one field section of the standard signal; and a decode circuit for outputting a coincidence signal when a count value of said counter coincides with the set value of said field clock count setting register, and supplying the coincidence signal to a reset terminal of said counter.

3. An apparatus for identifying standard and non-standard video signals according to claim 1, wherein said first threshold value is one-half the maximum output value of said clock counting means.

4. An apparatus for identifying standard and non-standard video signals according to claim 1, wherein said count value holding means comprises a load hold flip-flop receiving the external vertical synchronizing signal as a load hold input and receiving the clock generated by said clock generating means as a clock input.

5. An apparatus for identifying standard and non-standard video signals according to claim 1, wherein said resetting means comprises a set-reset flip-flop receiving the external reset signal as a set input, and receiving the external vertical synchronizing signal as a reset input.

6. An apparatus for identifying standard and non-standard video signals, comprising:

clock generating means for generating a clock of a frequency of $a \times f_{SC}$ (a is an integer not less than 1, and $f_{SC}$ is a color carrier frequency) based on a color burst signal extracted from a video signal;

pulse thinning out means for thinning out an external vertical synchronizing signal separated from the video signal, and outputting the thinned out signal once every n fields (n is a plural number);

clock counting means whose count value is reset in response to an output pulse of said pulse thinning out means, said clock counting means counting the number of clocks generated by said clock generating means;

count value holding means for holding an output value of said clock counting means in response to the output pulse of said pulse thinning out means;

n field clock count setting means for setting a value corresponding to the number of clocks generated by said clock generating means in n field sections of a standard signal;

subtracting means for obtaining a difference between an output value of said count value holding means and the set value of said n field clock count setting means; and determining means for determining that the video signal is a non-standard signal when an absolute value of an output value of said subtracting means is higher than a predetermined threshold value.

7. An apparatus for identifying standard and non-standard video signals, comprising:

clock generating means for generating a clock of a frequency of $b \times f_H$ (b is a predetermined integer, and $f_H$ is a horizontal frequency) based on a horizontal synchronizing signal separated from a video signal;

burst extraction pulse generating means for generating a burst extraction pulse corresponding to a period of a color burst portion of the video signal once every field based on the external horizontal synchronizing signal and an external vertical synchronizing signal separated from the video signal, and the clock;

burst extracting means for extracting from the video signal a signal portion corresponding to an output period of the burst extraction pulse;

a band-pass filter whose center frequency is a burst frequency, said band-pass filter passing therethrough a burst frequency component of an output signal of said burst extracting means;

latch pulse generating means for generating, based on the burst extraction pulse and the clock, a latch pulse at a predetermined timing, defined by the clock, within the period of the color burst portion represented by the burst extraction pulse;

a holding means group comprising a number, (n+1), (n is a plural number) of holding means connected in series, said holding means holding an output of said band-pass filter in response to the latch pulse, and transmitting the output to succeeding holding means;

subtracting means for obtaining a difference between an output signal of the first holding means of said holding means group and an output signal of the (n+1)th holding means; and determining means for determining that the video signal is a non-standard signal when an absolute value of an output value of said subtracting means is higher than a predetermined threshold value.

8. An apparatus for identifying standard and non-standard video signals according to claim 7, wherein said latch pulse generating means generates the latch pulse at a center of the period of the color burst portion represented by the burst extraction pulse.

9. An apparatus for identifying standard and non-standard video signals according to claim 7, wherein said holding means comprises a load hold flip-flop receiving the latch pulse as a load hold input, and receiving the clock as a clock input.

10. An apparatus for identifying standard and non-standard video signals according to claim 7, wherein said predetermined integer b takes a value not less than 500.

* * * * *